United States Patent [19]

Kammerer

[11] Patent Number: 5,313,237
[45] Date of Patent: May 17, 1994

[54] CAMERA APPARATUS FOR RECORDING DATA IN A FILM MAGNETIC RECORDING LAYER

[75] Inventor: Gilbert E. Kammerer, Pittsford, N.Y.

[73] Assignee: Eastman Kodak Company, Rochester, N.Y.

[21] Appl. No.: 21,400

[22] Filed: Feb. 23, 1993

[51] Int. Cl.⁵ .................................. G03B 17/24
[52] U.S. Cl. .................................... 354/106
[58] Field of Search .............. 354/21, 105, 106, 107, 354/108; 335/284; 360/1, 2, 16, 17

[56] References Cited

U.S. PATENT DOCUMENTS

| | | | |
|---|---|---|---|
| 3,409,853 | 11/1968 | Guerth | 335/284 |
| 3,665,513 | 5/1972 | Benson et al. | 360/4 |
| 3,982,276 | 9/1976 | Roos | 360/17 |
| 4,363,038 | 12/1982 | Fagling | 360/17 |
| 4,678,299 | 7/1987 | Harvey | 354/21 |
| 4,860,037 | 8/1989 | Harvey | 354/21 |
| 4,862,200 | 8/1989 | Hicks | 354/75 |
| 5,021,820 | 6/1991 | Robison et al. | 355/40 |

Primary Examiner—Michael L. Gellner
Assistant Examiner—Howard B. Blankenship
Attorney, Agent, or Firm—Francis H. Boos, Jr.

[57] ABSTRACT

In a camera, data is recorded onto a film magnetic layer by anhysteretic recording with a device comprised of a planar master medium attached to a ring core, the core a magnetic field gap formed therein at the point at which it is attached to the master medium. A slightly underdamped L/C resonant circuit is formed with excitation windings on the core to provide an alternating bias field to the master medium to effect the anhysteretic recording of the master data onto the film magnetic layer. Provision is made to ensure intimate contact between the master medium and the film magnetic layer while the film is stationary during the recording process.

8 Claims, 4 Drawing Sheets

CAMERA APPARATUS FOR RECORDING DATA IN A FILM MAGNETIC RECORDING LAYER

FIELD OF INVENTION

This invention relates to the field of photographic film cameras and more specifically to cameras adapted to magnetically record data onto a film magnetic layer.

BACKGROUND

Magnetic recording of data in a camera onto a magnetic layer formed on the photographic film is a well known concept, an example of which is described in commonly assigned U.S. Pat. No. 5,021,820 dated Jun. 4, 1991. Generally, the film with its magnetic layer is transported past a magnetic recording head to which a digital data signal is applied to serially transfer the data bitwise onto the magnetic layer. It is known that accurate knowledge of the film velocity as it is transported past the record head is required to properly record data by this means.

An alternative approach in magnetic recording of data on film which does not involve film velocity consideration is to contact print the digital data from a pre-recorded master medium onto a target slave medium comprised of the film magnetic layer. The basic concept of contact printing of magnetic data is also well known and is used extensively in the mass production of pre-recorded magnetic tapes from a master tape. It is important in contact printing of magnetic data that there be no relative motion between the master and slave media during the contact printing transfer process.

In general, contact printing of magnetic data is performed using one of two basic methods. In one, referred, as "hysteretic recording", a master medium is employed that has sufficient magnetic properties (surface field magnitude) such that only intimate contact with the slave medium is needed to initiate the contact printing process. With this method, the contact printing transfer process ceases when the master and slave media are sufficiently separated. Separation must be accomplished carefully such that there is no relative motion between master and slave in the plane of the magnetic surface.

In the alternative method, known as "anhysteretic" recording, a master medium is provided that has a relative low surface field magnitude that by itself, is insufficient to affect the intended slave medium. The actual contact printing transfer process is realized by making intimate contact between the master and slave media and then applying an alternating magnetic field which has sufficient magnitude that, when summed with the surface field from the master medium, results in a switching of all the slave medium particles thus transferring the master data onto the slave medium. As is known, the applied field must then be removed while the master and slave media are kept in intimate contact with no relative motion in the plane of the magnetic surface. In commercial application of this process, master and slave are transported past a fixed source of alternating magnetic field while intimate contact is maintained. The apparatus employed to achieve successful anhysteretic contact printing is generally very bulky and consumes a great deal of power relative to the limitations imposed by application of this method to a battery-operated camera environment.

There is a need in camera data recording technology to record a fixed set of encoded character on the magnetic layer which bears a fixed and highly determinate physical location with respect to image boundaries on the film. An example would be marking of an image frame as a pseudo panoramic ("pseudo pan") frame would then be sensed at the photographic printer to adjust masking and magnification factors to create an elongated panoramic print from a normal frame image on the film. While the type of magnetic recording of data involving transport of film past a record head as contemplated in the aforementioned patent is capable of providing such marking, the cost and complexity of the sophisticated recording techniques needed for high density data recording limits the application of this type of recording to high-end, relatively expensive cameras. Therefore, there is a need for a low cost simple arrangement to magnetically record fixed, pre-recorded data onto the film magnetic layer that would be suitable for low cost camera applications. The present invention satisfies this need.

SUMMARY OF THE INVENTION

Thus, in accordance with the present invention, there is provided camera apparatus for recording data on a film magnetic recording layer which comprises an anhysteretic magnetic recording device located in the camera including a first element bearing data magnetically pre-recorded thereon and a second element adapted to provide a bias field to the first element in response to an applied electrical stimulus. The camera apparatus also comprises means for providing the electrical stimulus to the second element to create a gradually decaying alternating magnetic bias field of sufficient initial magnitude to effect anhysteretic recording of the pre-recorded data onto film magnetic recording layer. The apparatus preferably also includes means for holding the master medium in intimate contact with the film magnetic recording layer at least while the film is stationary during the anhysteretic recording of the master medium data onto the film magnetic layer.

DETAILED DESCRIPTION

Figure 1:
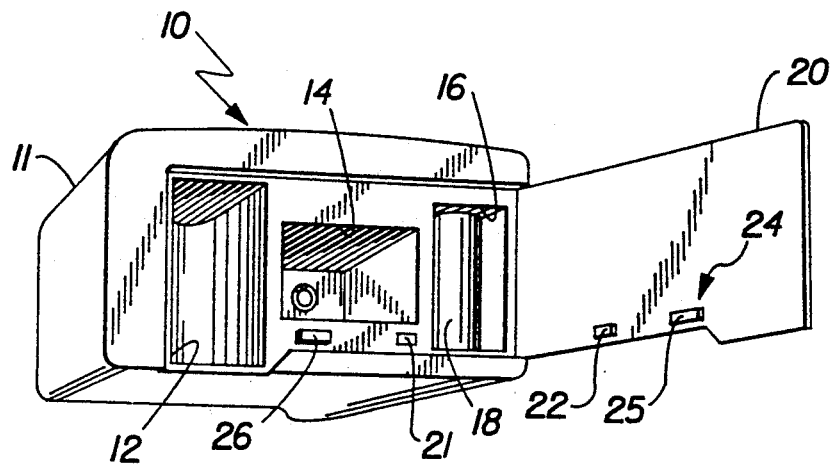
FIG. 1 is a perspective illustration of a camera embodying the present invention.
Figure 2:
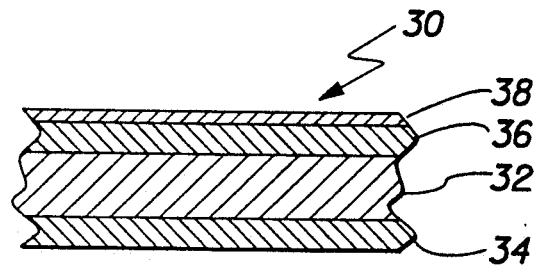
FIG. 2 is side elevation view of a section of photographic film including a magnetic recording layer useful with the present invention.
Figure 3:
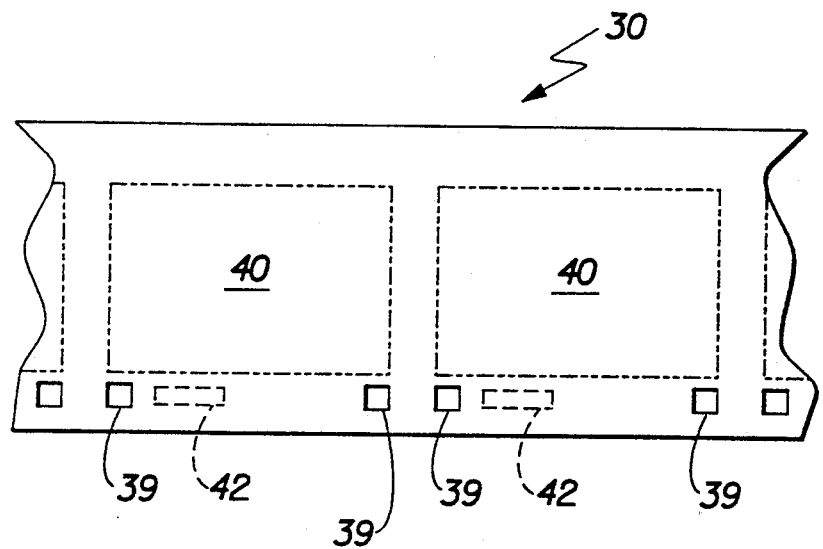
FIG. 3 is a plan view of a section of photographic film useful in explaining the present invention.

Referring now to FIG. 1, a camera 10 in which the present invention is embodied is comprised of a camera body 11 and a hinged back cover 20. Camera body 11 is conventionally provided with a film cartridge chamber 12, a film frame exposure aperture 14, film take-up chamber 16 and film take-up spool 18. Perforation sensing means for silm metering in the camera includes a light emitting LED 21 mounted in the camera body 11 adjacent exposure aperture 14 and a light sensor 22 mounted on camera back 20 such that when back 20 is closed sensor 22 is aligned with LED 21. A film drive motor (not shown) is mounted within camera body 11 and drives takeup spool 18 to advance a film strip through the camera thereby to position successive image frame areas over the exposure aperture 14. In accordance with the present invention, a magnetic contact printing unit 24 is mounted on camera back 20 and is so positioned thereon that, when the camera back 20 is closed, an exposed surface 25 of the printing unit 24 is aligned with a pressure pad 26 mounted on the camera body adjacent the exposure aperture 14. The surface 25 bears fixed, magnetically recorded data thereon which is intended to be recorded onto a magnetic layer formed on photographic film. Referring to FIG. 2, a representative strip 30 of color negative film with which the present invention is useful includes a base 32 various well known photochemical layers 34 on one side of the base 32 and a layer of virtually transparent magnetic material 36 on the other side. An anti-static and lubricating layer 38 overlies the magnetic layer 36. As seen in FIG. 3, the film strip 30 includes perforations 39 spaced in pairs along the film edge at regular intervals matching the pitch of image frame areas 40 on the film strip. The actual pitch of the image frame areas 40 is determined by the pairs of perforations 39 operative in conjunction with the perforation sensor 21, 22 to stop the film advance motor with the next available film image area in position over the frame exposure aperture 14. Dotted outlines 42 indicate the areas on the film strip 30 in which magnetic data may be recorded, when appropriate, by the anhysteretic recording action of recording unit 24. Preferably, magnetic recording unit 24 is mounted on camera back 20 with the recording surface 25 normally spaced slightly away from pressure pad 26 to allow film strip 30 to move freely without frictional interference between the surface 25 and pad 26 when the film strip is advanced through the camera toward take-up chamber 16 and rewound into the film cartridge in chamber 12.

Figure 4:
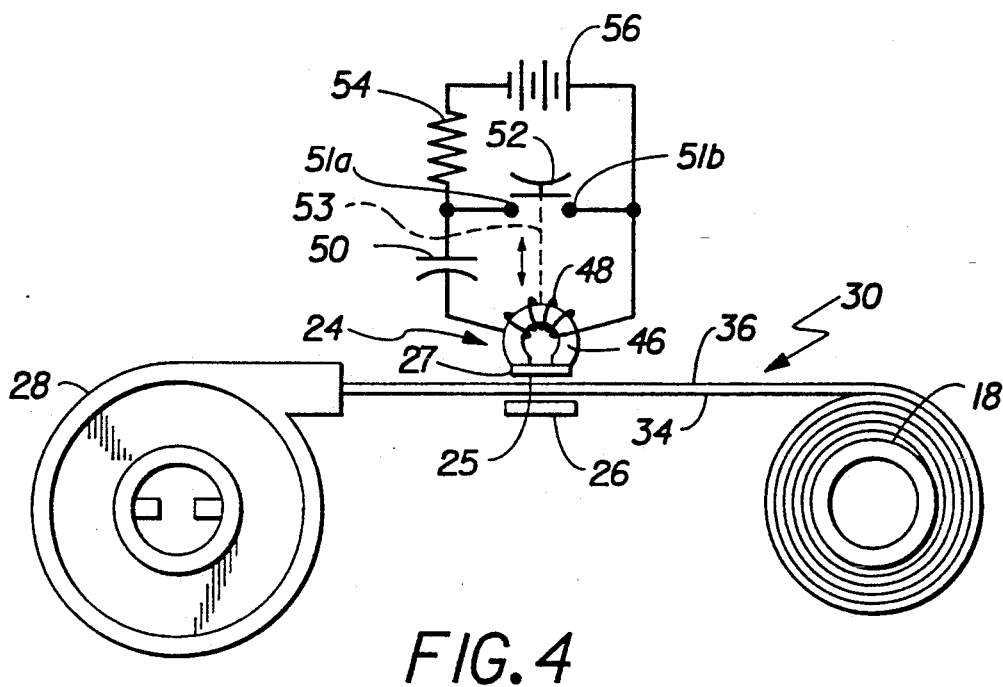
FIG. 4 is a schematic diagram of camera apparatus illustrating an embodiment of film encodement apparatus of the present invention.

Referring to FIG. 4, a film strip 30 is shown extending between a film cartridge 28 and film take-up spool 18 within a camera. As viewed in the drawing, the photo-chemical emulsion side 34 is facing down, i.e. facing the camera lens, and magnetic layer side 36 is facing up. In accordance with the invention, camera apparatus for recording data on the magnetic layer 36 includes a first element comprised of a thin plate 27 of magnetic material serving as a master medium bearing data magnetically pre-recorded on the exposed undersurface 25 and a second element of magnetic material adapted to provide a bias field to the first element 27 in response to an applied electrical stimulus. In the illustrated embodiment, this second element is comprised of a ring core 46 having a magnetic field gap "G" formed therein and adhesively secured to master medium plate 27. The data recording camera apparatus further comprises circuit means for providing an electrical stimulus to the ring core 46 to generate an alternating bias field of sufficient magnitude to effect anhysteretic recording of the pre-recorded data from the master medium plate 27 onto the film magnetic recording layer 36. This circuit means includes magnetic field inducing excitation coil 48 wound on ring core 46, energy storage capacitor 50, normally open push button switch 52 and battery 56. Push button switch 52 is accessible to the camera user at the back of the camera. When depressed by the camera user switch contacts 51a, 51b, are closed an inductive-capacitive resonant circuit with coil 48 and capacitance 50 so as to provide the electrical stimulus to the recording unit 24 needed to effect anhysteretic recording on the film magnetic layer 36. The values of capacitance 50 and inductance of coil 48 are suitably chosen to form an underdamped resonant circuit to produce an alternating bias field in ring core 46 that is initially sufficient to effect the data transfer and that gradually declines to a level at which the film can be moved subsequently without adverse effect on the recorded data on the film magnetic layer 36. Preferably, push button switch 52 is mechanically associated with the magnetic recording unit 24 so that depression of the button urges the magnetically pre-recorded surface 25 into intimate contact with magnetic layer 36 by the pressure exerted against the pressure pad 26. It will be appreciated that pressure pad 26 may be a separate pad formed adjacent the exposure aperture 14 or may be simply the flat surface of the flange area around the aperture 14. When push button 52 is depressed to close the switch contacts and urge master medium plate 27 against the film, the initial resonant current through coil 48 generates an alternating magnetic field which, through suitable design of the circuit parameters, is sufficient to transfer the pre-recorded data on surface 25 onto the magnetic layer 36 of the film 30.

Figure 5:
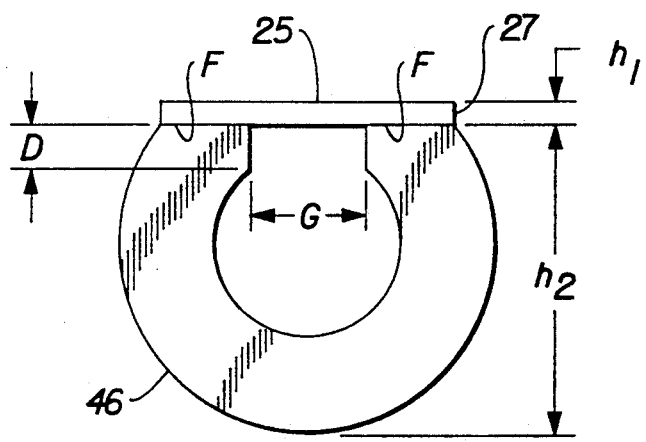
FIG. 5 is a side view diagram of magnetic recording elements useful in the encodement apparatus of FIG. 4.
Figure 6:
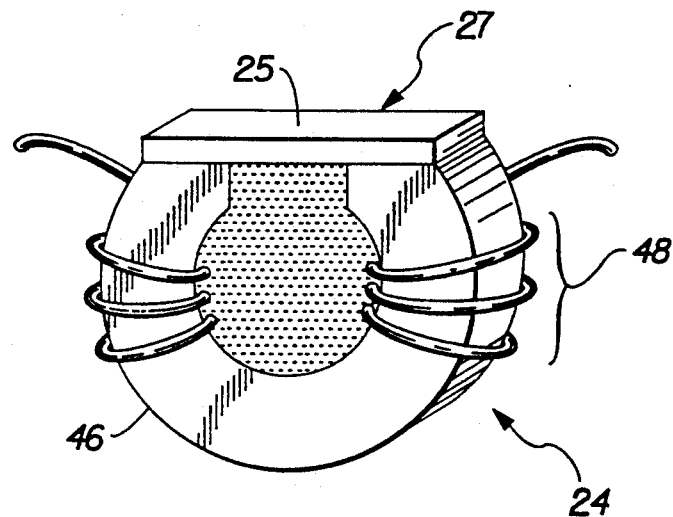
FIG. 6 is a side perspective view of the magnetic recording elements of FIG. 5.

By convention, the data that is pre-recorded on master medium plate 27 may indicate a frame format, such as a pseudo-pan format, and thus serve as an instruction readable at the photofinishing printer to automatically set the printer mask and magnification to reproduce the film image in an elongated panoramic format. Since the recording unit 24 has only a fixed data code pre-recorded on the master medium, other data codes may be recorded onto the film 30 by providing two or more of the recording units 24 on the camera back with separately operable push buttons The structure of a presently preferred embodiment of the recording unit is shown in greater detail in FIGS. 5 and 6. The unit is comprised of a ferrite ring core with a portion of the periphery removed, as by grinding or inital mold casting, to form a gap "G" and adjacent flats "F". The master medium plate 27 of thickness "h" is secured to the flats "F" with a suitable adhesive preferably formed in a very thin layer with a thickness of approximately one-tenth the thickness of plate 27. After the core 46 is wound with a suitable number of turns to form excitation coil 48, the open center of the core is preferably filled with epoxy or other suitable compound.

Figure 7:
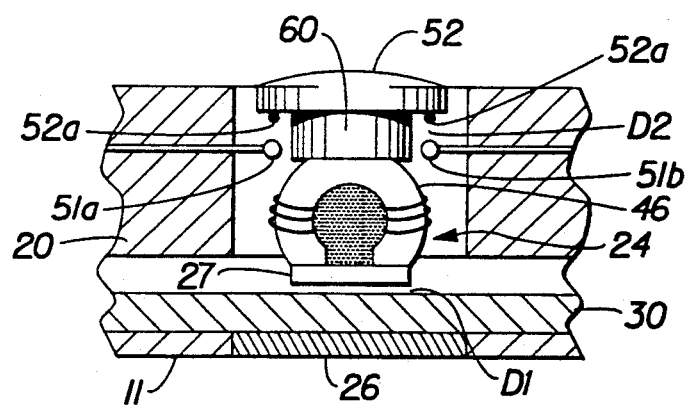
FIG. 7 is a side elevation view of a portion of camera apparatus illustrating additional details of the present invention.

In FIG. 7, a schematic illustration of a physical arrangement of the recording unit 24 in a camera back 20 is shown. The recording unit 24 is suspended in a slot formed in camera back 20 by adhesive coupling to a compressible pad 60 which, in turn, is adhesively secured to the under side of push button 52. A suitable flexible membrane (not shown) may be provided to cover push button 52 to block light from entering the camera. When push button 52 is depressed by the camera user, electrical bridging contacts 52a are adapted to engage circuit contacts 51a, 51b to form the resonant circuit as described in reference to FIG. 4. When push button 52 is not depressed, the spacing D1 between master recording medium plate 27 and film 30 is sufficient to allow interference-free translation of film in the camera. At a time when the film is stationary, for example either before or after taking of a picture and before the film is advanced to the next available image frame area, the push button 52 may depressed by the camera user to transfer the pre-recorded data from master medium plate 27 onto the magnetic layer on film 30. Because it is important to assure intimate contact between the pre-recorded surface 25 of plate 27 and the film magnetic layer 36, a spacing D2 is provided between bridging contacts 52a and terminals 51a, 51b that is slightly greater than the spacing D1 between plate 27 and film 30. Thus plate 27 is assured of being in intimate contact with the magnetic layer on the film when the push button switch 52 is closed to initiate the resonant circuit action that creates the alternating bias field needed for data transfer to occur. The compression of pad 60 allows for the additional travel of bridging contacts 52a toward contacts 51a, 51b after plate 27 comes in contact with film 30.

Figure 8:
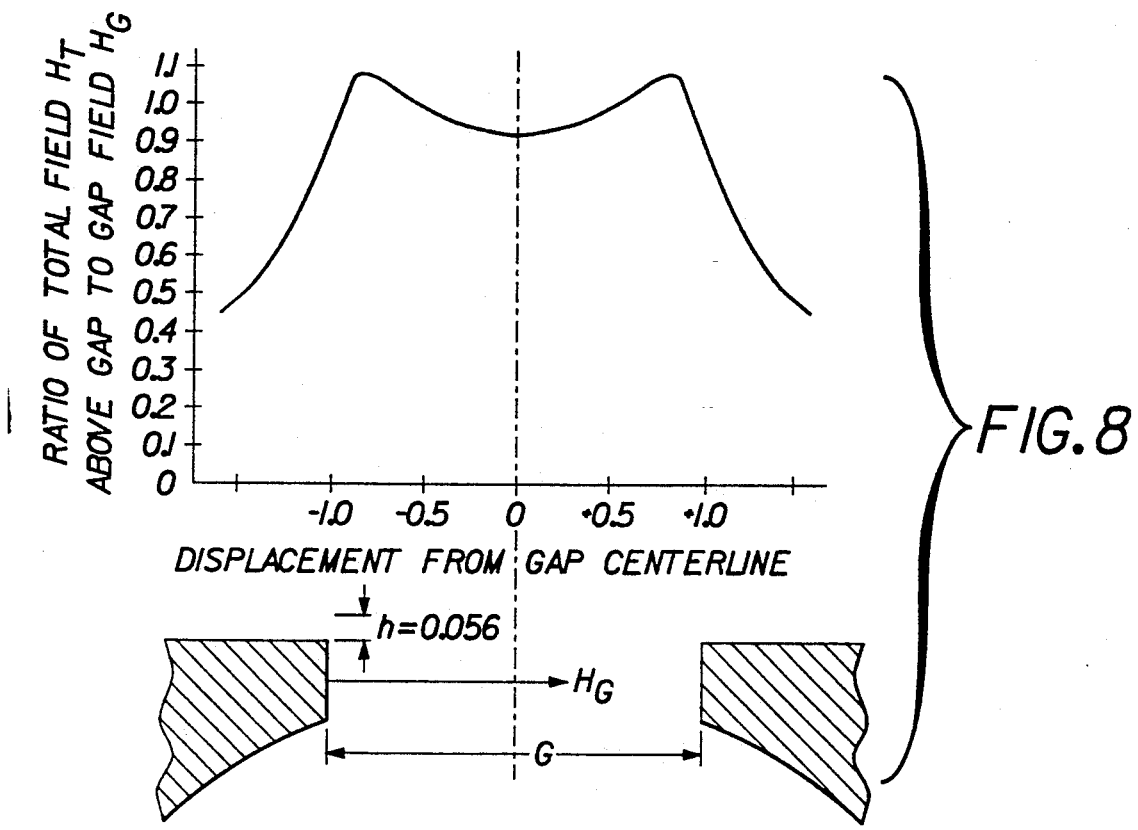
FIG. 8 is a graphical diagram of a magnetic field diagram generated by a ring core with a gap formed therein and useful in explaining the present invention.
Figure 9:
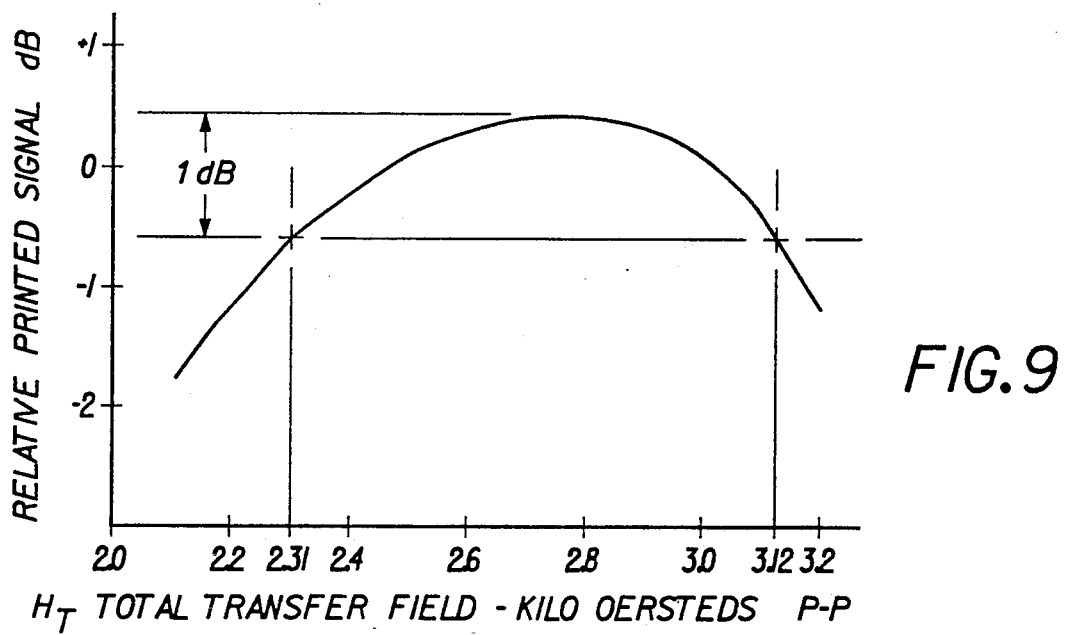
FIG. 9 is graphical diagram of recorded signal strength obtained with apparatus of the present invention.

Referring jointly to FIGS. 8 and 9, there will now be described design considerations associated with the anhysteretic recording feature of the invention. Considering first the physical dimensions of an actually constructed device, an exemplary ring core 46 is provided having physical and magnetic properties given in Table I.

TABLE I

| | |
|---|---|
| Outside diameter | 0.155 in. (0.394 cm) |
| Inside diameter | 0.088 in. (0.224 cm) |
| Thickness | 0.050 in. (0.127 cm) |
| Gap depth "D" | 0.008 in. (0.020 cm) |
| Gap length "G" | 0.040 in. (0.102 cm) |
| Height of modified core $h_2$ | 0.126 in. (0.320 cm) |
| Mag. path length $l_e$ | 0.362 in. (0.919 cm) |
| Eff. core area $A_e$ | 0.0016 sq. in (0.010 cm$^2$) |
| Core material | 3D3 ferrite |
| Initial Permeability $\mu_i$ | 675 |
| Saturation flux density $B_s$ | 3800 gauss |

The gap field "$H_G$" in Oersteds is given by the following relationship:

$$H_G = \frac{4\pi NI}{10G} \quad (1)$$

where:
G is the gap length in centimeters
N is the no. of turns in excitation coil 48
I is the coil current in amperes Based on eq. (1), the graph of FIG. 8 shows the ratio, $H_T/H_G$, of total magnetic field above the gap "$H_T$" to the gap field "$H_G$" plotted at a height of the gap "h," above the gap equal to $0.05 \times G$.

The graph of FIG. 9 shows a plot of the magnitude of a contact printed signal versus the peak-to-peak magnitude of the transfer field at the surface 25 of the master medium plate 27. It can be seen from this graph that optimum contact printed signal is obtained when $H_T=2750$ Oersteds peak-to-peak. This graph also shows that the printed signal will be within 1 dB of optimum over an applied field range of 2310 to 3120 Oersteds, i.e. 2750+13% to −19%. It can also be seen from the graph of FIG. 8 that the applied field "$H_T$" ranges from 1.02 $H_G \pm 7.8\%$ from edge to edge of the gap. Thus, the contact printed signal is well within 1 dB of optimum over the zone covered by the gap G of the recording unit.

Applying the above discussion and Eq. (1) for values of $H_T=2750$ Oersteds and G=0.040 in., NI is found to equal 218 ampere-turns peak-to-peak or 109 ampere-turns 0-to-peak. In the circuit of FIG. 4, substantially all of the energy stored in capacitor 50 is transferred to energy stored in the ring core 46 when push button switch 52 is closed. From this fact, the capacitance of capacitor 50 can be calculated as follows:

Energy "$e_c$" stored in $C_{50}$:

$$e_c = \frac{C_{50}V_0^2}{2} \quad (2)$$

where $V_0$ is the initial voltage value across the capacitor 50

Energy "$e_l$" stored in ring core 46:

$$e_l = \frac{L i^2}{2} \quad (3)$$

where L is the inductance of the excitation coil 48 and is expressed as:

$$L = N\, d\phi/di \quad (4)$$

where $\phi$ is the total flux in the core 46 given by:

$$\phi = H_G \mu_0 A_G \quad (5)$$

in which $\mu_0$ is the permeability of free space and $A_G$ is the area of the gap. From Eq. (5) and the gap dimensions previously given, it can be shown that:

$$L = 2.61 \times 10^{-10} \times N^2 \quad (6)$$

Setting the expressions for stored energy equal and solving for $C_{50}$:

$$C_{50} = \frac{2.61 \times 10^{-10} \times N^2 \times i^2}{V_0^2} \quad (7)$$

The foregoing calculations assume that all flux in the ring core is gap flux. However, it will be appreciated by those skilled in the art that, to account for leakage flux, the value of $C_{50}$ would be increased appropriately to achieve the desired value of peak current. The value of resistor 54 in the charging circuit of FIG. 4 is preferably chosen to be low enough to assure that capacitor 50 will be fully recharged before the next closure of switch 52 but not so low that significant gap flux is created by the flow of charging current through the excitation coil 48.

It will be apparent from the foregoing that what has been described is a unique camera data recording apparatus that offers several advantages. Compared to direct recording with a conventional magnetic record head, the present apparatus does not require relative motion between the recording unit 24 and the film magnetic layer which would require consequent precise control or knowledge of film velocity. As compared to hysteretic contact printing, the described apparatus does not require precise control of relative motion in the magnetic plane during separation of master and slave media. Moreover, it places reduced demands on the magnetic properties of the master medium. As compared to other implementations of anhysteretic contact printing, the present apparatus can be realized in much less volume and at much lower cost than systems using ring core structures or permanent magnet arrays in combination with motion of the master and slave media relative to the field source to create the decaying alternating field, which is of particular concern in the tight confines of camera configurations.

The invention has been described in detail with particular reference to a presently preferred embodiment, but it will be understood that variations and modifications can be effected within the scope of the invention as set forth in the claims appended hereto.

What is claimed is:

1. Camera apparatus for recording data on a film magnetic recording layer comprising:
    a magnetic recording device located in the camera including a first element comprising a master medium bearing data magnetically pre-recorded thereon and a magnetic second element adapted to provide a bias field to the first element in response to an applied electrical stimulus; and
    circuit means coupled to said second element for providing an electrical stimulus to said second element to generate a gradually decaying alternating bias field to effect anhysteretic recording of said pre-recorded data from said master medium onto said film magnetic recording layer.

2. Apparatus according to claim 1 further including pressure means for holding said master medium in intimate contact with said magnetic layer while said film is stationary in the camera during said anhysteretic recording of data onto said magnetic layer.

3. Apparatus according to claim 1 in which said first element is comprised of a planar magnetic material having said pre-recorded data on a first planar surface facing the magnetic layer on the film.

4. Apparatus according to claim 3 in which said second element is comprised of a magnetic ring core with a gap portion formed in the periphery of the core, the gap portion of the core being secured to a reverse planar surface of the master medium whereby fringe magnetic fields from the gap portion extend to the pre-recorded first surface of the master medium.

5. Apparatus according to claim 1 in which said second element is a ring core and in which said circuit means comprises a resonant circuit having a decaying resonant characteristic following initial stimulus.

6. Apparatus according to claim 5 in which said circuit means includes an inductive winding on said ring core and a capacitance to form an L/C resonant circuit.

7. Apparatus for recording data on a film magnetic recording layer in a camera comprising:
    an anhysteretic recording device bearing magnetically pre-recorded data and positioned adjacent a film exposure gate in the camera; and
    means for activating said device at a time when film is stationary in the camera to effect anhysteretic recording of said pre-recorded data onto said film magnetic recording layer.

8. Camera apparatus for providing magnetically recorded data on film of the type having a magnetic recording layer thereon, the apparatus comprising:
    an anhysteretic magnetic recording device located in the camera including a first element bearing pre-recorded magnetic data and a second element in magnetic contact with the first element for providing a bias field to the first element in response to an applied electrical stimulus;
    means for maintaining intimate contact between said film magnetic recording layer and said first element while said film is stationary in the camera; and
    means including an underdamped resonant circuit for providing an electrical stimulus to said second element to effect anhysteretic recording of said pre-recorded data onto said film while said first element is in intimate contact with said film magnetic recording layer.

* * * * *